US006728515B1

(12) United States Patent
Wooh

(10) Patent No.: US 6,728,515 B1
(45) Date of Patent: Apr. 27, 2004

(54) TUNED WAVE PHASED ARRAY

(75) Inventor: Shi-Chang Wooh, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/505,039

(22) Filed: Feb. 16, 2000

(51) Int. Cl.[7] .............................................. H04B 17/00

(52) U.S. Cl. ................................ 455/67.11; 455/67.14; 455/67.16; 455/81; 73/625; 73/626

(58) Field of Search ............................... 455/67.1, 67.4, 455/68, 80, 81, 59, 63, 276.1, 277.1, 277.2, 278.1, 304, 562, 137, 67.6; 333/157, 159, 208, 209, 239, 248, 250; 343/762, 777, 844

(56) References Cited

U.S. PATENT DOCUMENTS

| | | | |
|---|---|---|---|
| 3,564,488 | A | 2/1971 | Higashi et al. |
| 3,812,708 | A | 5/1974 | Cowan et al. |
| 3,829,827 | A | 8/1974 | Ernvein |
| 3,937,068 | A | 2/1976 | Joy |
| 3,962,908 | A | 6/1976 | Joy |
| 3,978,713 | A | 9/1976 | Penney |
| 4,004,455 | A | 1/1977 | McKee et al. |
| 4,127,035 | A | 11/1978 | Vasile |
| 4,143,553 | A | 3/1979 | Martens et al. |
| 4,174,636 | A | 11/1979 | Pagano |

(List continued on next page.)

FOREIGN PATENT DOCUMENTS

| | | | |
|---|---|---|---|
| EP | 0 935 258 A1 | 8/1999 | |
| GB | 2008756 B | 7/1982 | |
| GB | 2164220 B | 2/1988 | |
| JP | 4-64350 A | 2/1992 | |
| WO | WO 96/12951 | 5/1996 | |
| WO | WO 96/22527 | 7/1996 | |

OTHER PUBLICATIONS

Thompson et al., "Quantitative Nondestructive Evaluation", Center for NDE and Department of Aerospace Engineering and Engineering Mechanics, Iowa State University, American Institute of Physics, Melville, NY, AIP Conference Proceedings, vol. 19A, 831–838 (Jul. 1999).

Safaeinili et al., "Air–Coupled Ultrasonic Estimation of Viscoelastic Stiffness in Plates", *IEEE Transactions on Utrasonics, Ferroelectrics, and Frequency Control*, vol. 43, 1171–1179 (Nov. 1996).

G. A. Alers, *Railroad Rail Flaw Detection System Based on Electromagnetic Acoustic Transducers*, U.S. Department of Transportation Report DOT/FRA/ORD–88/09 (Sep. 1988).

Wooh et al., Time Frequency Analysis of Broadband Dispersive Waves Using the Wavelet Transform, *Review of Progress Quantitative Nondestructive Evaluations*, American Institute of Physics, Melville, NY, AIP Conference Proceedings, vol. 19A, pp. 831–838, Jul. 25–30, 1999.

C. B. Scruby amd L. E. Drain, *Laser–Ultrasonics: Techniques and Applications*, Adam Hilger, Briston UK (1990).

*Primary Examiner*—Dwayne Bost
*Assistant Examiner*—Temia M. Davis
(74) *Attorney, Agent, or Firm*—Iandiorio & Teska

(57) ABSTRACT

A tuned wave phased array includes a plurality of spaced transmitter elements, a signal generator that produces an activation signal for activating the transmitter elements to transmit a guided wave in an associated medium and a delay circuit for sequentially delaying the activation of at least one of the transmitter elements for creating constructive interference of a selected mode of the wave propagating in the medium, thereby boosting the selected mode of the wave.

14 Claims, 9 Drawing Sheets

U.S. PATENT DOCUMENTS

| | | | | | |
|---|---|---|---|---|---|
| 4,248,092 | A | | 2/1981 | Vasile et al. | |
| 4,338,822 | A | | 7/1982 | Yamaguchi et al. | |
| 4,354,388 | A | | 10/1982 | Diepers et al. | |
| 4,372,163 | A | | 2/1983 | Tittmann et al. | |
| 4,435,984 | A | | 3/1984 | Gruber | |
| 4,437,031 | A | | 3/1984 | Gunshor et al. | |
| 4,481,822 | A | | 11/1984 | Kubota et al. | |
| 4,487,071 | A | | 12/1984 | Pagano et al. | |
| 4,497,210 | A | | 2/1985 | Uchida et al. | |
| 4,512,197 | A | | 4/1985 | von Gutfeld et al. | |
| 4,523,469 | A | | 6/1985 | Scott et al. | |
| 4,541,280 | A | | 9/1985 | Cielo et al. | |
| 4,567,769 | A | | 2/1986 | Barkhoudarian | |
| 4,570,487 | A | | 2/1986 | Gruber | |
| 4,619,529 | A | | 10/1986 | Iuchi et al. | |
| 4,633,715 | A | | 1/1987 | Monchalin | |
| 4,659,224 | A | | 4/1987 | Monchalin | |
| 4,688,429 | A | | 8/1987 | Holroyd | |
| 4,700,574 | A | | 10/1987 | Turbe | |
| 4,785,667 | A | | 11/1988 | Miyajima et al. | |
| 4,821,575 | A | | 4/1989 | Fujikake et al. | |
| 4,834,111 | A | | 5/1989 | Khanna et al. | |
| 4,866,614 | A | | 9/1989 | Tam | |
| 4,932,618 | A | | 6/1990 | Davenport et al. | |
| 5,035,144 | A | | 7/1991 | Aussel | |
| 5,079,070 | A | | 1/1992 | Chalco et al. | |
| 5,125,108 | A | * | 6/1992 | Talwar | 455/278.1 |
| 5,129,262 | A | | 7/1992 | White et al. | |
| 5,152,010 | A | * | 9/1992 | Talwar | 455/278.1 |
| 5,154,081 | A | | 10/1992 | Thompson et al. | |
| 5,172,343 | A | | 12/1992 | O'Donnell | |
| 5,212,988 | A | | 5/1993 | White et al. | |
| 5,257,544 | A | | 11/1993 | Khuri-Yakub et al. | |
| 5,265,831 | A | | 11/1993 | Muller | |
| 5,303,240 | A | * | 4/1994 | Borras et al. | 379/347 |
| 5,341,683 | A | | 8/1994 | Searle | |
| 5,353,512 | A | | 10/1994 | Theurer et al. | |
| 5,386,727 | A | | 2/1995 | Searle | |
| 5,402,235 | A | | 3/1995 | Monchalin | |
| 5,419,196 | A | | 5/1995 | Havira et al. | |
| 5,438,872 | A | | 8/1995 | Kobayashi et al. | |
| 5,439,157 | A | | 8/1995 | Geier et al. | |
| 5,457,997 | A | | 10/1995 | Naruo et al. | |
| 5,488,737 | A | * | 1/1996 | Harbin et al. | 455/562 |
| 5,522,265 | A | | 6/1996 | Jaeggi | |
| 5,532,697 | A | | 7/1996 | Hidaka et al. | |
| 5,549,003 | A | | 8/1996 | Drescher-Krasicka | |
| 5,574,224 | A | | 11/1996 | Jaeggi | |
| 5,574,989 | A | * | 11/1996 | Watson et al. | 455/101 |
| 5,578,758 | A | | 11/1996 | Havira et al. | |
| 5,606,256 | A | | 2/1997 | Takei | |
| 5,608,166 | A | | 3/1997 | Monchalin et al. | |
| 5,627,508 | A | | 5/1997 | Cooper et al. | |
| 5,629,485 | A | | 5/1997 | Rose et al. | |
| 5,634,936 | A | | 6/1997 | Linden et al. | |
| 5,646,350 | A | | 7/1997 | Robinson et al. | |
| 5,650,852 | A | | 7/1997 | Chastain et al. | |
| 5,665,907 | A | | 9/1997 | Sheen et al. | |
| 5,671,154 | A | | 9/1997 | Iizuka et al. | |
| 5,672,830 | A | | 9/1997 | Rogers et al. | |
| 5,684,592 | A | | 11/1997 | Mitchell et al. | |
| 5,698,787 | A | | 12/1997 | Parzuchowski et al. | |
| 5,724,138 | A | | 3/1998 | Reich et al. | |
| 5,760,307 | A | | 6/1998 | Latimer et al. | |
| 5,760,904 | A | | 6/1998 | Lorraine et al. | |
| 5,763,785 | A | | 6/1998 | Chiang | |
| 5,767,410 | A | | 6/1998 | Lareau et al. | |
| 5,801,312 | A | | 9/1998 | Lorraine et al. | |
| 5,804,727 | A | | 9/1998 | Lu et al. | |
| 5,808,199 | A | | 9/1998 | Kazys et al. | |
| 5,814,732 | A | | 9/1998 | Nogami | |
| 5,818,592 | A | | 10/1998 | Womack et al. | |
| 5,824,908 | A | | 10/1998 | Schindel et al. | |
| 5,827,188 | A | | 10/1998 | Wright et al. | |
| 5,926,503 | A | * | 7/1999 | Kelton et al. | 375/148 |
| 5,930,293 | A | * | 7/1999 | Light et al. | 375/211 |
| 6,061,553 | A | * | 5/2000 | Matsuoka et al. | 455/273 |
| 6,067,391 | A | * | 5/2000 | Land | 385/27 |
| 6,078,788 | A | * | 6/2000 | Haardt | 455/65 |
| 6,092,420 | A | | 7/2000 | Kimura et al. | |
| 6,128,092 | A | | 10/2000 | Levesque et al. | |
| 6,186,004 | B1 | | 2/2001 | Kaduchak et al. | |
| 6,253,618 | B1 | | 7/2001 | Wooh | |
| 6,324,912 | B1 | | 12/2001 | Wooh | |
| 6,351,586 | B1 | * | 2/2002 | Krol et al. | 385/39 |
| 6,360,609 | B1 | | 3/2002 | Wooh | |
| 6,382,028 | B1 | | 5/2002 | Wooh et al. | |
| 2001/0015104 | A1 | | 8/2001 | Wooh | |
| 2001/0020390 | A1 | | 9/2001 | Wooh | |
| 2002/0108445 | A1 | | 8/2002 | Wooh | |

* cited by examiner (a)

PULSED ELEMENT
RECEIVER
RECEIVED WAVEFORM
TUNED MODE 46
16
20
28a
28b
28c
28d
d
34
36
40
41
42
44
48

TUNED WAVE PHASED ARRAY

FIELD OF INVENTION

This invention relates generally to a tuned wave phased array, and more particularly to a system for tuning transmitted and received guided waves to prefer selected propagation wave modes.

BACKGROUND OF INVENTION

Guided waves, such as Lamb waves, are typically used to carry out ultrasonic nondestructive evaluation (NDE) of thin-wall structures such as pipes, shells, membranes, and plates. Guided waves are preferred because they can travel long distances, thereby making it possible to inspect wide areas with fewer measurements. Guided waves are generally analyzed by the well-known Rayleigh-Lamb wave dispersion relationship, expressed in terms of the thickness of the material and certain material constants, such as the modulus of elasticity, Poisson's ratio, or wave velocities. In determining dispersion equations, a set of curves can be obtained which relates phase velocities and frequencies. Such a set of curves is shown in FIG. 1, which is a graph of the multiple dispersion curves corresponding to propagation modes for waves in an aluminum plate of a thickness 2h.

Guided waves are both multi-modal and dispersive in nature. They are dispersive, meaning that waves oscillating in different frequencies travel at different speeds. In other words, phase velocity is not a constant value but a function of frequency. This means that the wave motion depends on the characteristics of the excitation signal. As a result, a broadband signal such as a spike pulse traveling in a dispersive medium may significantly change its shape as it propagates in the medium. On the other hand, the shape of an extremely narrowband signal, such as a tone burst signal, is preserved as it propagates in the medium.

Since broadband pulses are often too complicated and difficult to analyze, a more conventional approach is to use narrowband signals whose carrier frequency is swept over the width of the frequency band of interest. The advantage to this approach is that the signal retains its shape as it propagaltes in the medium. It is thus easier to analyze data and visualize the propagating and reflecting waves directly in the time domain.

In addition to dispersion, the other characteristic that distinguishes guided waves from bulk ultrasonic waves is their multi-modality. For a given thickness and frequency, there may exist many different propagation modes which are basically grouped into two different fundamental families: symmetric (S) and anti-symmetric (A) mode, such as those shown in FIG. 1. The Rayleigh-Lamb relationship yields infinitely many harmonic solutions for each mode. But, for NDE, it is desirable to differentiate one particular mode of propagation from the other modes, resulting in fewer peaks in the waveforms acquired.

Each dispersion curve corresponds to a particular mode of propagation and, for any given frequency, there exists at least, two modes of propagation. These signals in their untuned state are generally too complicated to analyze and therefore it is necessary to distinguish a particular mode of interest from the other co-existing modes. Two systems for generating guided waves in a selected mode are angle wedge tuners and array transducers. These systems are described separately below.

The most common system for generating guided waves is an angle wedge tuner or oblique angle insonification system.

In general, a variable or fixed angle wedge transducer is used for controlling the incident angle of the applied signal. The wedge may be placed directly on the specimen, or alternatively, the insonification and detection and be made without direct contact using immersion and air-coupled transducers.

The basic principle for wedge tuning is Snell's law:

$$\sin\theta_w = \frac{c_w}{c_p}, \tag{1}$$

where $\theta_w$ is the angle of incidence for tuning a selected mode propagating at the phase velocity $c_p$ and $c_w$ is the longitudinal wave velocity in the wedge which typically is 2,720 m/s. Accordingly, once the carrier frequency of the tone burst signal, the thickness of the medium under test and the longitudinal wave velocity in the wedge are known, the graph of FIG. 1 may be used to determine the required phase velocity to tune the signal to the selected mode.

Problems associated with the angle wedge transducer include the difficulty of accurately setting the angle of incidence, since the variable wedge is manipulated manually. Accordingly, the sensitivity due to misalignment is uncertain and error levels may vary for different modes and frequencies. Another drawback results from the numerous interfaces that the signal must traverse in the wedge assembly. Typically, a variable angle wedge transducer includes two parts, a main wedge and block rotating around the wedge. Since the transducer is mounted on the block, three interfaces exist in the transducer-wedge assembly: one between the transducer and the rotating block; one between the rotating block and the main wedge; and one between the wedge and the medium under test. These interfaces can introduce reflections, resulting in unwanted peaks in the transmitted signal. This problem is greater for smaller angles of incidence, where small multiple reflections may occur. Another limitation of the wedge tuning technique is that Snell's Law becomes invalid in cases where $c_p$ is less than $c_w$. Consequently, angle wedge transducers cannot tune modes whose phase velocity falls below that of the longitudinal waves in the wedge. For example, the $A_0$ mode in the low frequency range cannot be tuned using angle wedge tuner, because $c_p$ is less than 2,720 m/s as shown in FIG. 1. Yet another disadvantage in the angle wedge transducer comes from the fact that the wedge works as a delay block as a whole, requiring additional travel time that must be taken into account in the analysis of the received signal. Furthermore, the signal may be attenuated significantly before impinging the medium under test.

Another commonly used method for nondestructive evaluation involves the use of array transducers for single mode excitation of Lamb waves. One type of array transducer is a comb transducer. Another type of array transducer is an interdigital transducer. These devices are able to tune a desired mode by matching the transducer element spacing with a frequency of the excitation signal. Both of these array transducers are linear arrays having elements that are placed at a certain distance apart. A gated sinusoidal signal excites all the elements at the same time. By adjusting the distance between the elements, it is possible to generate guided waves of wavelength equal to the distance between the elements.

Although array transducers can be more effective than the angle wedge transducer, there are disadvantages to using array transducers. The most critical problem is that the wave inherently propagates bidirectionally. This is because all of the transducer elements are simultaneously activated by the same signal, resulting in a symmetric excitation pattern. As a consequence, waves emanate from both sides of the transducer elements. Another disadvantage is that the transducer arrays cannot be effectively used as receivers because they are not able to accommodate the time delays introduced during reception.

SUMMARY OF THE INVENTION

It is therefore an object of this invention to provide a tuned wave phased array for non-destructive evaluation of materials.

It is a further object of this invention to provide such a tuned wave phased array that dynamically tunes a transmitted guided wave to prefer a selected wave mode.

It is a further object of this invention to provide such a tuned wave phased array that suppresses undesired wave modes of the guided wave.

It is yet a further object of the invention to provide such a tuned wave phased array that can unidirectionally transmit the selected mode of the guided wave.

The invention results from the realization that a truly effective nondestructive evaluation system and method can be obtained by utilizing a plurality of individually controlled transceiver elements for transmitting a wave and for constructively interfering with the transmitted wave for dynamically tuning the wave to prefer a selected wave mode while suppressing undesired wave modes, and for receiving and processing the tuned wave.

This invention features a tuned wave phased array including a plurality of spaced transmitter elements, a signal generator that produces an activation signal for activating the transmitter elements to transmit a guided wave in an associated medium and a delay circuit for sequentially delaying the activation of at least one of the transmitter elements for creating constructive interference of a selected mode of the wave propagating in the medium, thereby boosting the selected mode of the wave.

In a preferred embodiment, the delay circuit may delay the activation signal an amount which corresponds to a distance between each of the transmitter elements. The tuned wave phased array may include first and second transmitter elements separated by a distance d, the first transmitter element being directly activated by the activation signal and the second transmitter element being activated by the activation signal after it has been delayed an amount $\Delta\tau$ by the delay circuit. The delay $\Delta\tau$ may be determined from the equation $$\Delta\tau = \frac{d}{c_p},$$

where $c_p$ is the phase velocity of the transmitted wave.

This invention also features a method of generating a tuned single mode guided wave including transmitting a first wave into a medium and transmitting a second wave into the medium, the second wave being delayed from the first wave by a delay $\Delta\tau$ to constructively interfere the first and second waves to boost a selected propagation mode of the guided wave.

In a preferred embodiment, the amount of the delay $\Delta\tau$ may be a function of the phase velocity of the first and second waves in the medium.

This invention also features a tuned wave phased array receiver including a plurality of spaced receiver elements for sensing a substantially single mode guided wave in a medium and a delay circuit for sequentially delaying the substantially single mode guided wave received by at least one of the receiver elements to compensate for the spacing between the receiver elements.

In a preferred embodiment, the delay circuit may delay the received guided wave an amount which corresponds to a distance between each of the receiver elements. The tuned wave phased array receiver may further including a summer and first and second receiver elements separated by a distance d, the first receiver element receiving the guided wave earlier in time than the second receiver element, the first receiver element outputting its received guided wave to the delay circuit for delaying the received guided wave by an amount of time $\Delta\tau$, the delay circuit then outputting the delayed guided wave to the summer. The second receiver element may output its received guided wave to the summer, wherein the summer outputs the sum of the delayed guided wave received by the first receiver element and the guided wave received by the second receiver element. The delay $\Delta\tau$ may be determined from the equation:

$$\Delta\tau = \frac{d}{c_p},$$

where $c_p$ is the phase velocity of the guided wave.

This invention also features a method of processing a substantially single mode guided wave in a medium, the method including sequentially sensing, at different points in time, the substantially single mode guided wave to produce a plurality of received substantially single mode guided waves being delayed in time with respect to each other, and sequentially delaying the plurality of sequentially sensed substantially single mode guided waves to align the sequentially sensed substantially single mode guided wave in time.

In a preferred embodiment, the method may further include summing the plurality of aligned substantially single mode guided waves.

This invention also features a tuned wave phased array including a plurality of spaced transmitter elements and a signal generator that produces a plurality of activation signals for activating the transmitter elements to transmit a guided wave in an associated medium. The plurality of activation signals are generated at different points in time for creating constructive interference of a selected mode of the wave propagating in the medium, thereby boosting the selected mode of the wave.

BRIEF DESCRIPTION OF THE DRAWINGS

Other objects, features and advantages will occur to those skilled in the art from the following description of a preferred embodiment and the accompanying drawings, in which.

DETAILED DESCRIPTION

Figure 2:
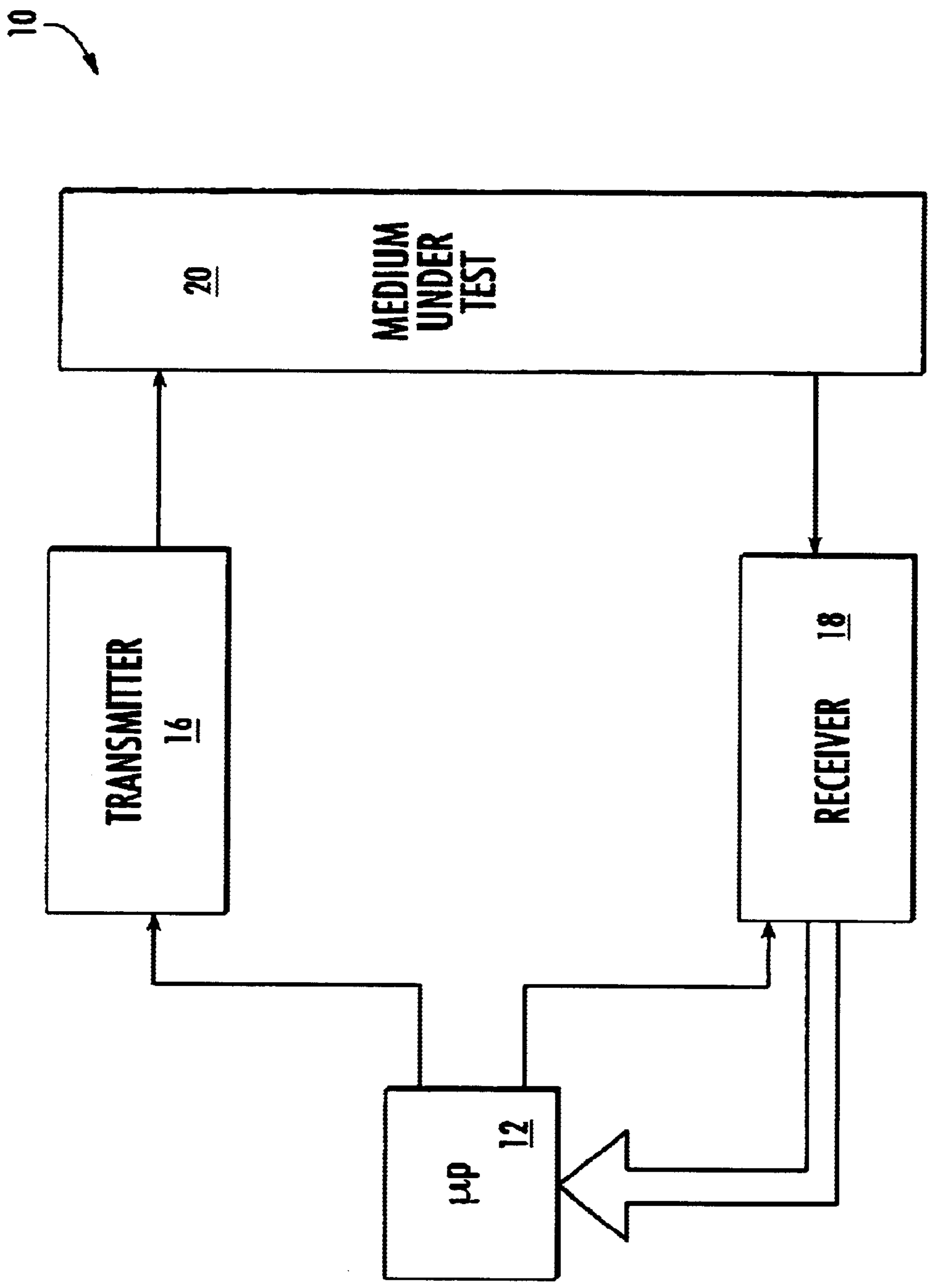
FIG. 2 is a block diagram of the tuned wave phased array of the present invention.

The tuned wave phased array 10 of the present invention is generally shown in the block diagram of FIG. 2. Phased array system 10 includes a microprocessor 12 for controlling a transmitter portion 16 and a receiver portion 18. Transmitter portion 16 transmits guided waves to the medium under test 20 and receiver portion 18 receives guided waves from the medium under test 20. As discussed in greater detail below, the apparatus 10 can be used solely for transmitting guided waves, solely for receiving guided waves or for both transmitting and receiving guided waves.

Figure 3:
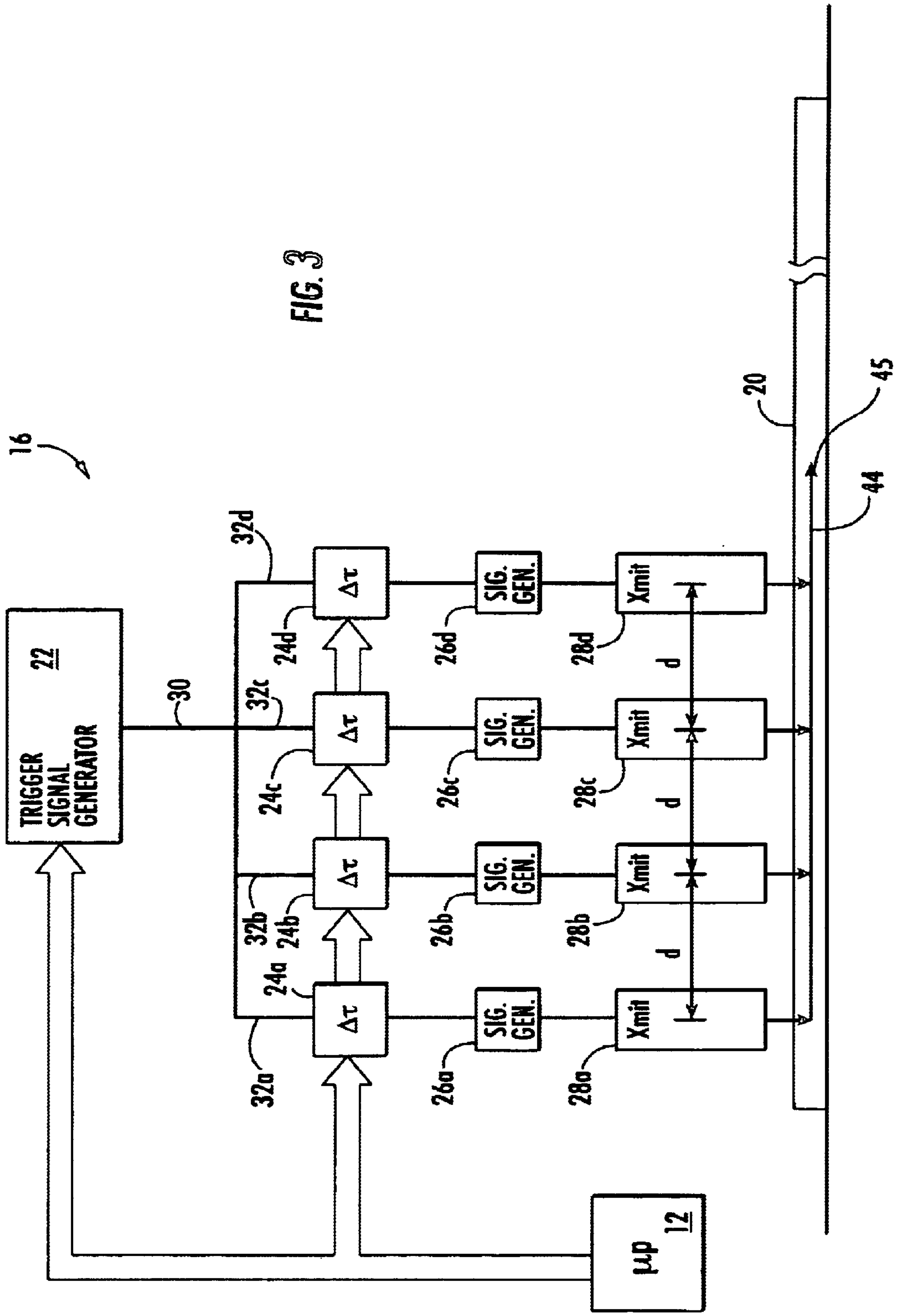
FIG. 3 is a detailed block diagram of the transmitter portion of the tuned wave phased array of the present invention.

FIG. 3 is a block diagram that shows the components of transmitter portion 16. Transmitter portion 16 includes a trigger signal generator 22, controlled by the microprocessor 12. Delay devices 24*a*–24*d* each receive an input signal on lines 32*a*–32*d*, respectively. Tone burst signal generators 26*a*, 26*b*, 26*c*, and 26*d*, receive signals from delay devices 24*a*, 24*b*, 24*c* and 24*d* respectively. Tone burst signal generators 26*a*–26*d* operate to activate transmitter elements 28*a*, 28*b*, 28*c*, 28*d*, respectively for transmitting a tone burst including, for example, five periods of a sine wave of a single frequency, into the medium under test 20. Although the invention is described as including four transmitters, it will be understood that the invention may be operated with as few as two transmitters or more than four transmitters. Delay devices 24*a*–24*d* are responsive to microprocessor 12 for delaying the input signals on lines 32*a*–32*d* a predetermined amount, as described below. Generally, when transmitting a wave in the direction indicated by arrow 45, delay device 24*a* provides zero delay, delay device 24*b* provides a delay of Δτ, delay device 24*c* provides a delay of 2Δτ and delay device 24*d* provides a delay of 3Δτ. When the transmitter portion 16 transmits a wave in the direction opposite that shown by arrow 45, the delay amounts are reversed: delay device 24*a* provides a delay of 3Δτ, delay device 24*b* provides a delay of 2Δτ, delay device 24*c* provides a delay of Δτ and delay device 24*d* provides zero delay.

When the trigger signal generator 22 is triggered by the microprocessor 12, a control signal is sent along line 30 to each of the branches 32*a*, 32*b*, 32*c*, and 32*d*. The control signal present on line 32*a* is sent through delay device 24*a* to tone burst signal generator 26*a* without any delay, and the transmitting element 28*a* is activated, causing transmitting element 28*a* to transmit a tone burst into the medium under test 20. The signal present on line 32*b* is delayed by delay device 24*a* by an amount An and then supplied to tone burst signal generator 26*b* which activates transmitting element 28*b* to produce a tone burst in the medium under test 20. The signal on line 32*c* is delayed by a time 2Δτ by delay device 24*b* and the signal on line 32*d* is delayed by a time 3Δτ by delay device 24*c*. The associated tone burst signal generators 26*c* and 26*d* and transmitter elements 28*c* and 28*d* operate in a similar manner as tone burst signal generators 26*a* and 26*b* and transmitter elements 28*a* and 28*b*, as described above. The delay time Δτ is determined based on the spacing of the transmitting elements 28*a*–28*d*. As shown in FIG. 3, each transmitting element is spaced from the adjacent transmitting elements by a distance d. In order to tune the resulting guided wave to the selected mode, Δτ is determined according to the following equation:

$$\Delta\tau = \frac{d}{c_p}. \tag{2}$$

Figure 1:
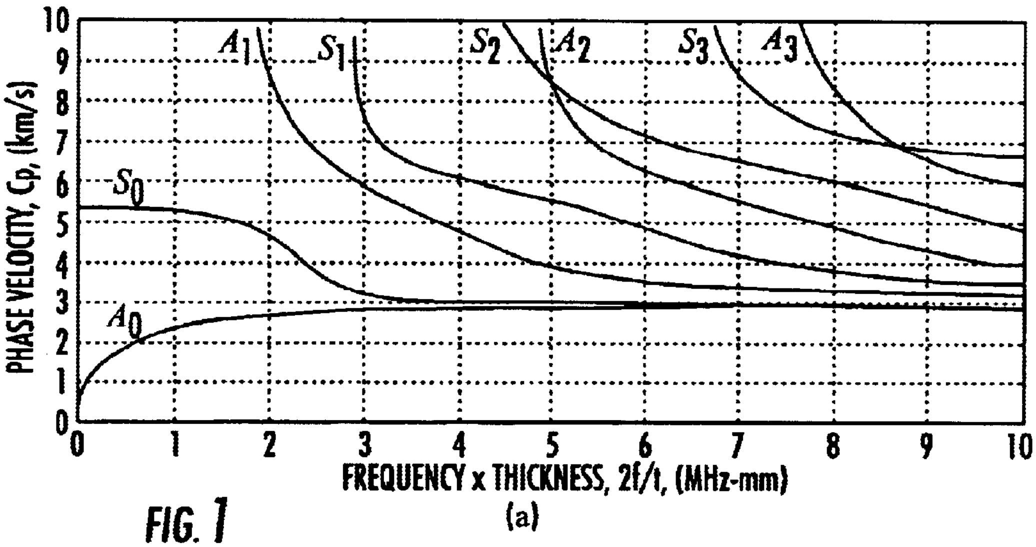
FIG. 1 is a graph which shows the various wave modes for an aluminum plate of thickness 2h.

For example, if the selected wave mode is the $A_1$ mode shown in FIG. 1 and the carrier frequency times twice the thickness of the medium to be tested is 3 MHz mm, the phase velocity of the $A_1$ mode of the wave is 6 km/s. If the spacing d between the transmitter elements is 1 cm, then, using equation (2), Δτ=1.67 microseconds. This example is shown schematically in FIGS. 4–7.

Figures 4A, 4B, 5A, 5B, 6A, 6B, 7A, 7B:
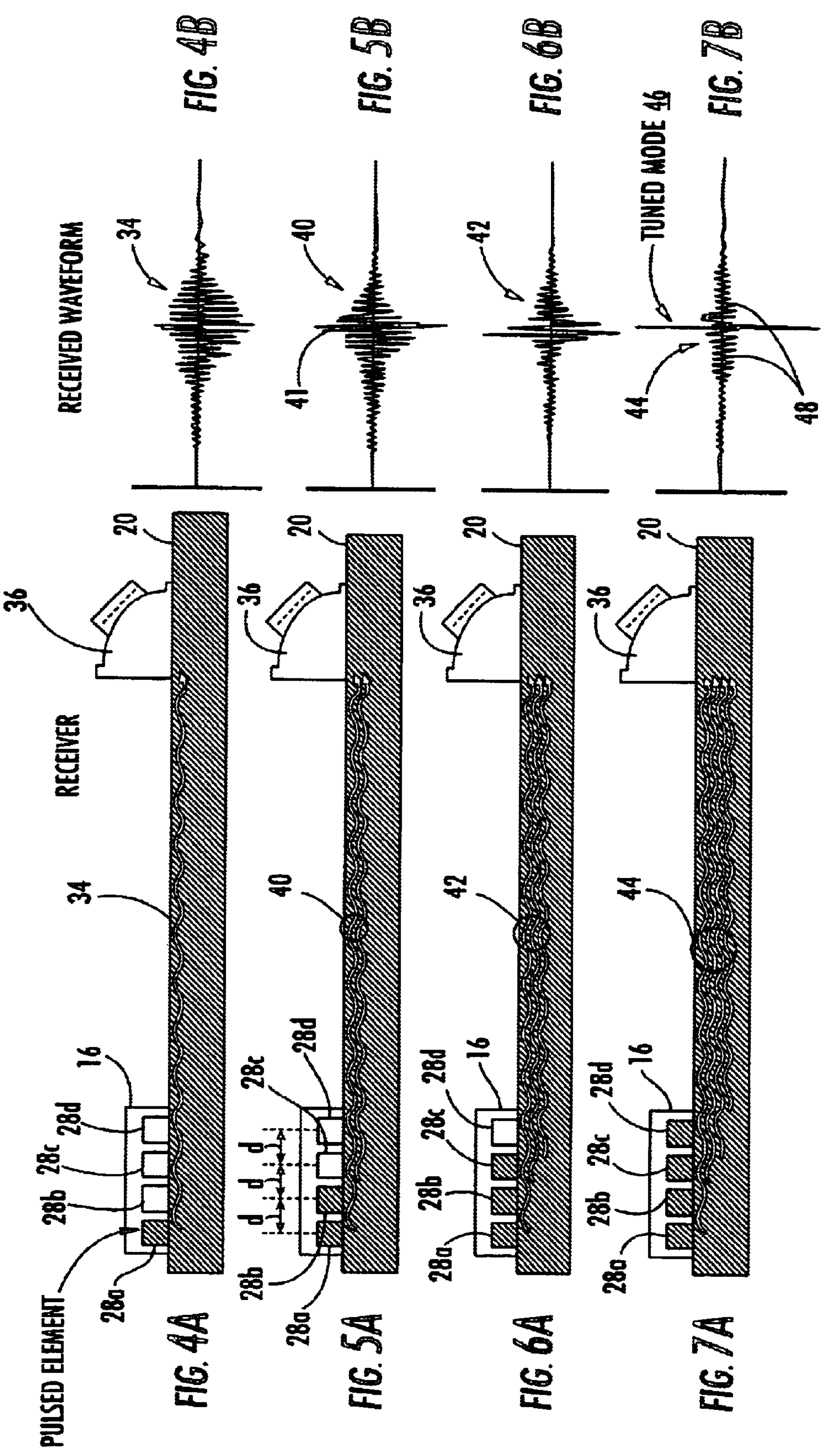
FIG. 4*a* is a schematic diagram of a guided wave transmitted by a single transceiver element in accordance with the present invention.
FIG. 4*b* is an illustration of the guided waveform shown in FIG. 4*a;*
FIG. 5*a* is a schematic diagram of a guided wave transmitted from two transducer elements in accordance with the present invention.
FIG. 5*b* is an illustration of the guided waveform shown in FIG. 5*a;*
FIG. 6*a* is a schematic diagram of a guided wave transmitted by three transducer elements in accordance with the present invention.
FIG. 6*b* is an illustration of the guided waveform shown in FIG. 6*a;*
FIG. 7*a* is a schematic diagram of a guided wave transmitted by four transducer elements in accordance with the present invention.
FIG. 7*b* is an illustration of the guided waveform shown in FIG. 7*a;*

FIG. 4*a* schematically shows transmitter elements 28*a*, 28*b*, 28*c*, and 28*d*, of transmitter portion 16. At a time $t_0$, transmitter element 28*a* is activated by tone burst signal generator 26*a* which receives the activation signed directly from trigger signal generator 22, FIG. 3, thereby transmitting a signal 34 into the medium under test 20. The wave generated by transmitter element 28*a* is multi-modal, bidirectional and dispersive. In other words, there may be several different waves traveling at different speeds in both directions from transmitter element 28*a*. If only one transmitter element was used to transmit the wave, the waveform that would be received by receiver 36 is shown in FIG. 4*b*. As can be seen in FIG. 4*b*, due to the dispersion of the received waveform, it is very difficult to extract the desired propagation mode from the received waveform. In FIG. 5*a*, after transmitter element 28*a* is activated, transmitter element 28*b* is activated by tone burst signal generator 26*b*, which receives the activation signal after a delay of Δτ, which, in this example, is 1.67 microseconds. The delay, Δτ, in activating transmitter element 28*b*, causes transmitter 28*b* to transmit the tone burst exactly when the wave front of the selected mode of the wave produced by transmitter 28*a* arrives underneath transmitter element 28*b*, resulting in a wave schematically shown at 40. The resulting waveform 40, when received by receiver 36, is shown in FIG. 5*b*. As can be seen in FIG. 5*b*, the waveform 40 has been tuned such that the selected mode 41 is more distinguishable within the received waveform 40. Due to dispersion, after the delay Δτ, the other, undesired wave modes of the waveform 40 are traveling at different speeds within the medium 20 and either may have already traveled beyond transmitting element 28*b* or have not yet reached transmitting element 28*b*.

Accordingly, by timing the transmitting elements to be activated with the specific delay $\Delta\tau$ between activations, due to constructive interference of the transmitted waves, the desired wave mode is boosted and the undesired wave modes are randomly modified, thereby suppressing the undesired wave modes.

This constructive interference is further demonstrated in FIGS. 6 and 7, where, in FIG. 6*a*, transmitting element 28*a* is activated at a time $t_0$. After the delay $\Delta\tau$, transmitting element 28*b* is activated, and after the delay $2\Delta\tau$ from the time to, transmitting element 28*c* is activated. The resulting waveform 42, as received by receiver 36, is shown in FIG. 6*b*. FIG. 7*a* shows a case where all four of the transmitting elements 28*a*–28*d* are activated, with the appropriate delay $\Delta\tau$ between the activation of each transmitting element. The resulting waveform 44 is shown in FIG. 7*b*. As can be seen in FIG. 7*b*, waveform 44 is tuned to the selected mode, shown as a spike 46, thereby facilitating the extraction of the desired mode from the received signal 44. It can be seen that the greater the number of transmitter elements used to create the waveform transmitted to the medium 20, the more finely tuned the selected wave mode is in the received signal. Thereby, by increasing the number of transmitter elements, the selected wave mode of the received waveform is boosted as shown at 46 in FIG. 7*b* and the undesired modes are suppressed as shown at 48 in FIG. 7*b*.

Figure 10:
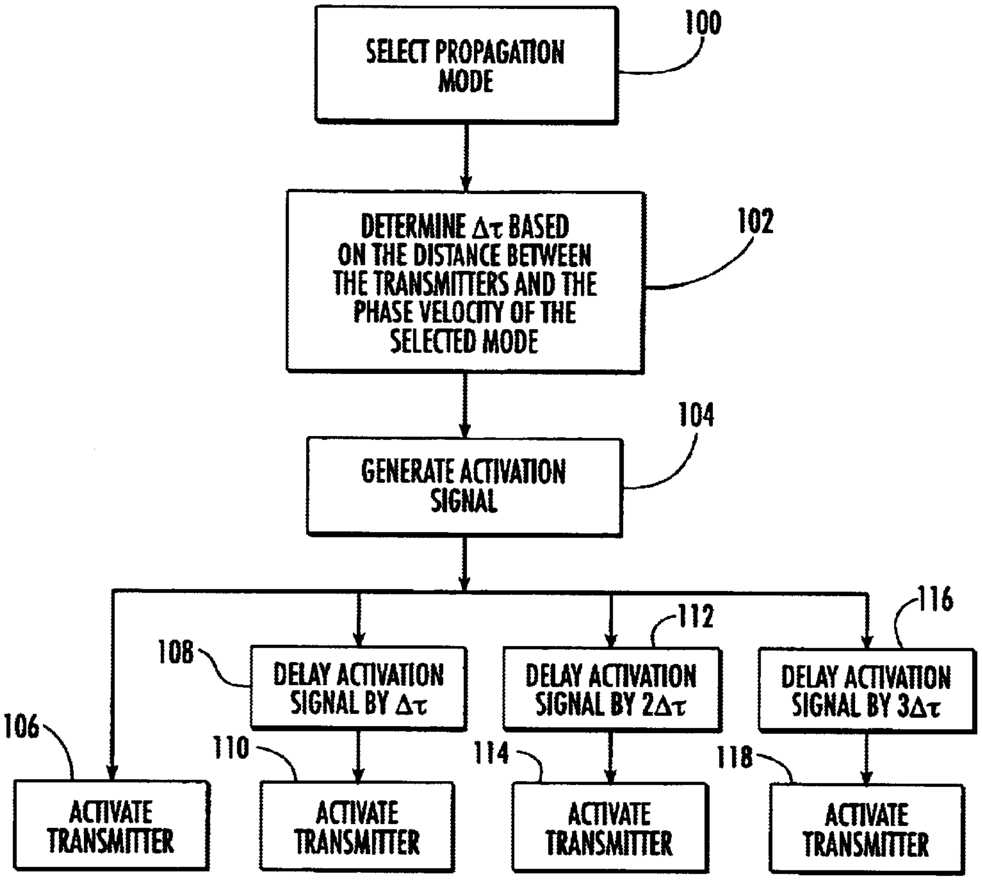
FIG. 10 is a flow diagram of the operation of the transmitter portion of FIG. 3.

FIG. 10 is a flow diagram which illustrates the method carried out by the transmitter portion 16. First, the propagation mode which is to be boosted is selected, block 100. The delay $\Delta\tau$ is then determined based on the distance between the transmitting elements and the phase velocity of the selected propagation mode, block 102. The activation signal is generated, block 104, which activates the first transmitter 28*a*, block 106. After the activation signal is delayed by $\Delta\tau$, block 108, the next transmitter 28*b* is activated, block 110. After the activation signal is delayed by $2\Delta\tau$, block 112, the next transmitter 28*c* is activated, block 114 and after the activation signal is delayed by $3\Delta\tau$, block 116, the final transmitter 28*d* is activated, block 118.

Figure 8:
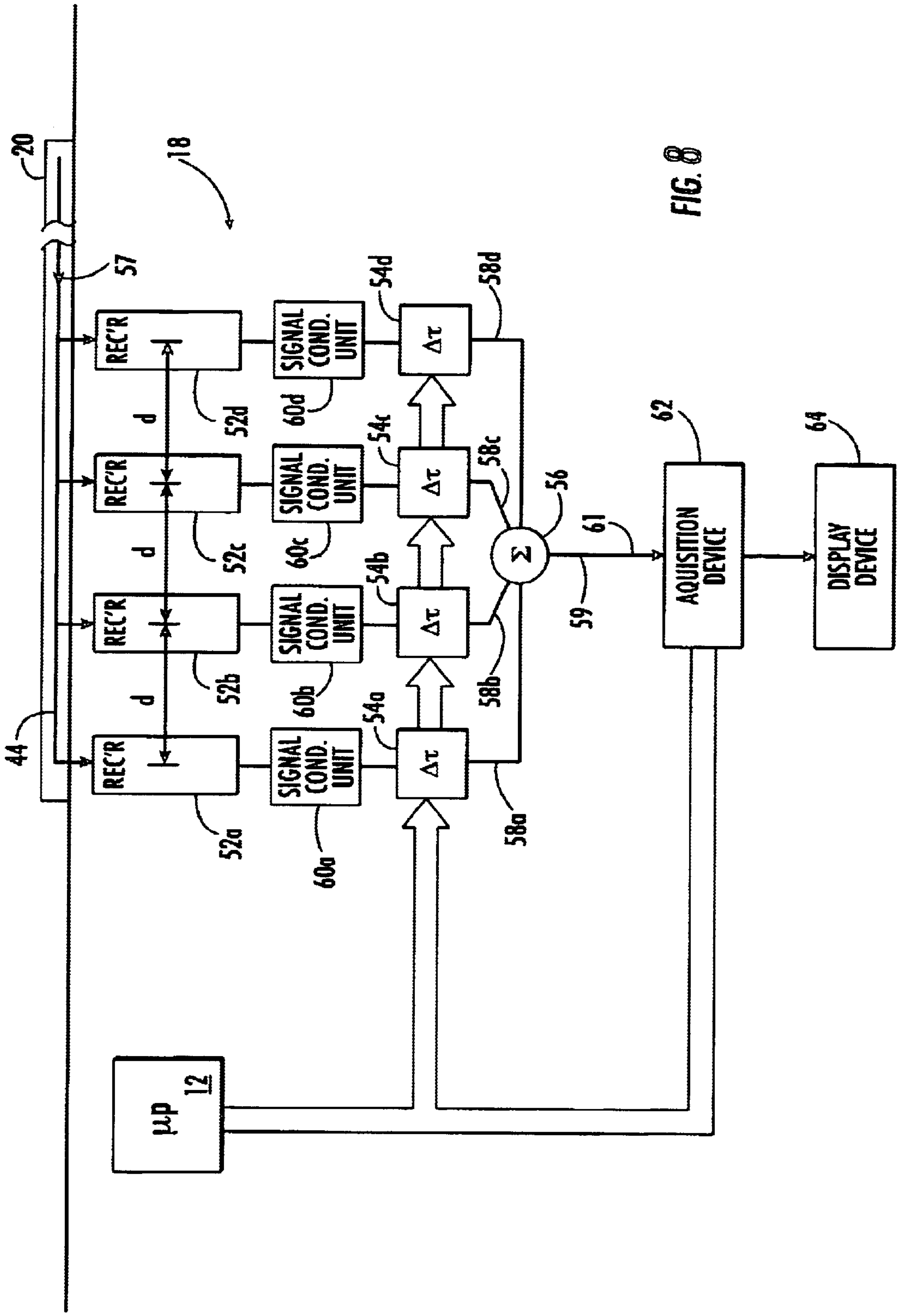
FIG. 8 is a detailed block diagram of the receiver portion of the tuned wave phased array in accordance with the present invention.

A detailed block diagram of receiver portion 18 of the phased array 10 is shown in FIG. 8. Once the guided wave is transmitted from transmitter portion 16 into medium 20, in order to locate any flaws in the medium or to measure the distance from the transmitter portion 16 to an edge of the medium 20, the guided wave transmitted by the transmitter portion 16 must then be received and analyzed. In a pitch-catch system, such that as that shown in FIGS. 4*a*–7*a*, the receiving portion 18 is located some distance away from the transmitter portion in order to receive the transmitted waveform. In a pulse-echo system, the receiving portion 18 is located proximate transmitter portion 16 for receiving the guided wave transmitted by the transmitting portion 16 after is reflected from either a defect or an edge of the medium 20. In either case, the receiving portion 18 includes receivers 52*a*, 52*b*, 52*c*, and 52*d* for sequentially receiving the transmitted or reflected waveform, such as the waveform 44, FIG. 7*b*. Although the invention is described as including four receivers, it will be understood that the invention may be operated with as few as two receivers or more than four receivers. Receivers 52*a*, 52*b*, 52*c*, and 52*d* may be spaced from each other the same distance d as the spacing of the transmitters 28*a*–28*d* in transmitter portion 16 although this is not necessary for proper operation of the invention. Receiver 52*a* is connected to a signal conditioning unit 60*a*, having an output connected to delay device 54*a*, receiver 52*b* is connected to a signal conditioning unit 60*b* having an output connected to a delay device 54*b*, receiver 52*c* is connected to a signal conditioning unit 60*c* having an output connected to a delay device 54*c*, and receiver 52*d* is connected to a signal conditioning unit 60*d* having an output connected to a delay device 54*d*. The outputs of delay devices 54*a*–54*d* are connected to a summer 56.

As the waveform 44 travels toward the receiver portion 18 in the direction indicated by arrow 57, it is first received by receiver 52*d*. After a time delay $\Delta\tau$, which is determined using equation (2), the signal is received by receiver 52*c*. After another delay of $\Delta\tau$, the waveform 44 is received by receiver 52*b* and finally, after another delay of $\Delta\tau$, the signal is received by receiver 52*a*. Each of the received waveforms are then amplified in the respective signal conditioning units 60*a*–60*d*. When the received wave form is traveling in the direction indicated by arrow 57, the waveform received by receiver 52*d* is then delayed in delay device 54*d* by a period $3\Delta\tau$, the waveform received by receiver 52*c* is delayed by delay device 54*c* by a period $2\Delta\tau$, the waveform received by receiver 52*b* is delayed by delay device 54*b* by a period $\Delta\tau$ and the wave form received by receiver 52*a* is passed through delay device 54*a* without a delay. This sequenced delay ensures that all of the signals received by the receivers 52*a*–52*d* are input into summer 56 concurrently. The received waveform on line 58*a* from receiver 52*a*, the received and delayed waveform on line 58*b*, the delayed waveform on line 58*c* and the delayed waveform on line 58*d*, all of which have the same configuration as the waveform 44 shown in FIG. 7*b*, are summed in summer 56, resulting in one waveform 44 which is tuned to the selected wave mode. The summed signal is then input into acquisition device 62 for saving the received and amplified signal for analysis. Acquisition device 62 then imports the signal to microprocessor 12. An optional display device 64 such as a monitor or printer can be used for displaying the single from acquisition device 62. If the received wave is traveling in the direction opposite of the direction indicated by arrow 57, sequence of delays provided by delay device 54*a*–54*d* is reversed.

Figure 11:
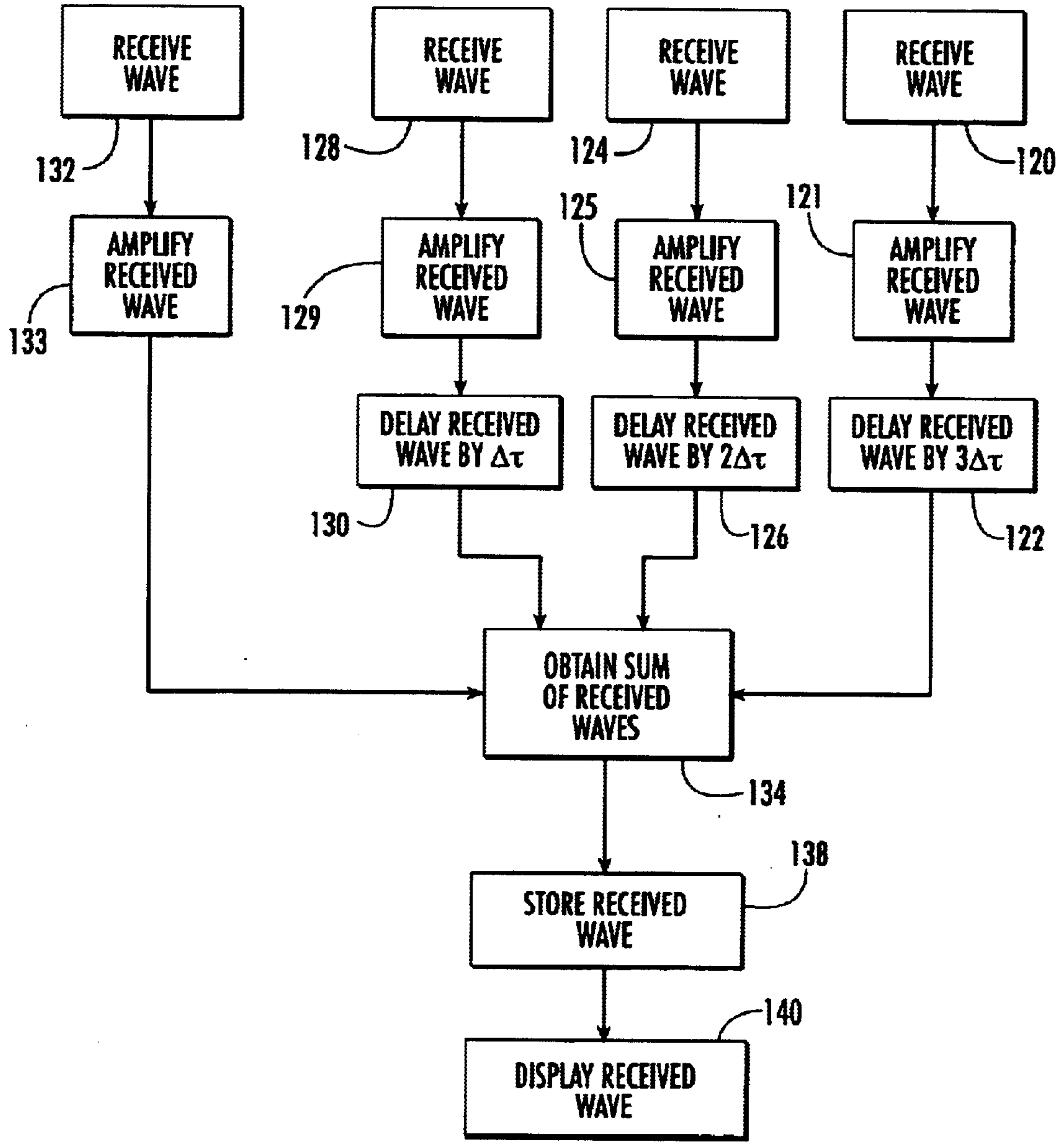
FIG. 11 is a flow diagram of the operation of the receiver portion of FIG. 8.

The method carried out by the receiver portion 18 is shown in the flow diagram of FIG. 11. First, the single mode guided wave is received by the first receiver 52*d*, block 120, and the received wave is amplified, block 121 and delayed by $3\Delta\tau$, block 122. The wave is then received by the next receiver 52*c*, block 124, amplified, block 125, and delayed by $2\Delta\tau$, block 126. The wave is then received by the next receiver 52*b*, block 128, amplified, block 129, and delayed by $\Delta\tau$, block 130. After the final receiver 52*a* has received the wave, block 132, the wave is delayed, block 133, the sum of the received waves is obtained, block 134, the received wave is amplified, block 136, and stored, block 138. The received wave can then be displayed, block 140.

Figure 9:
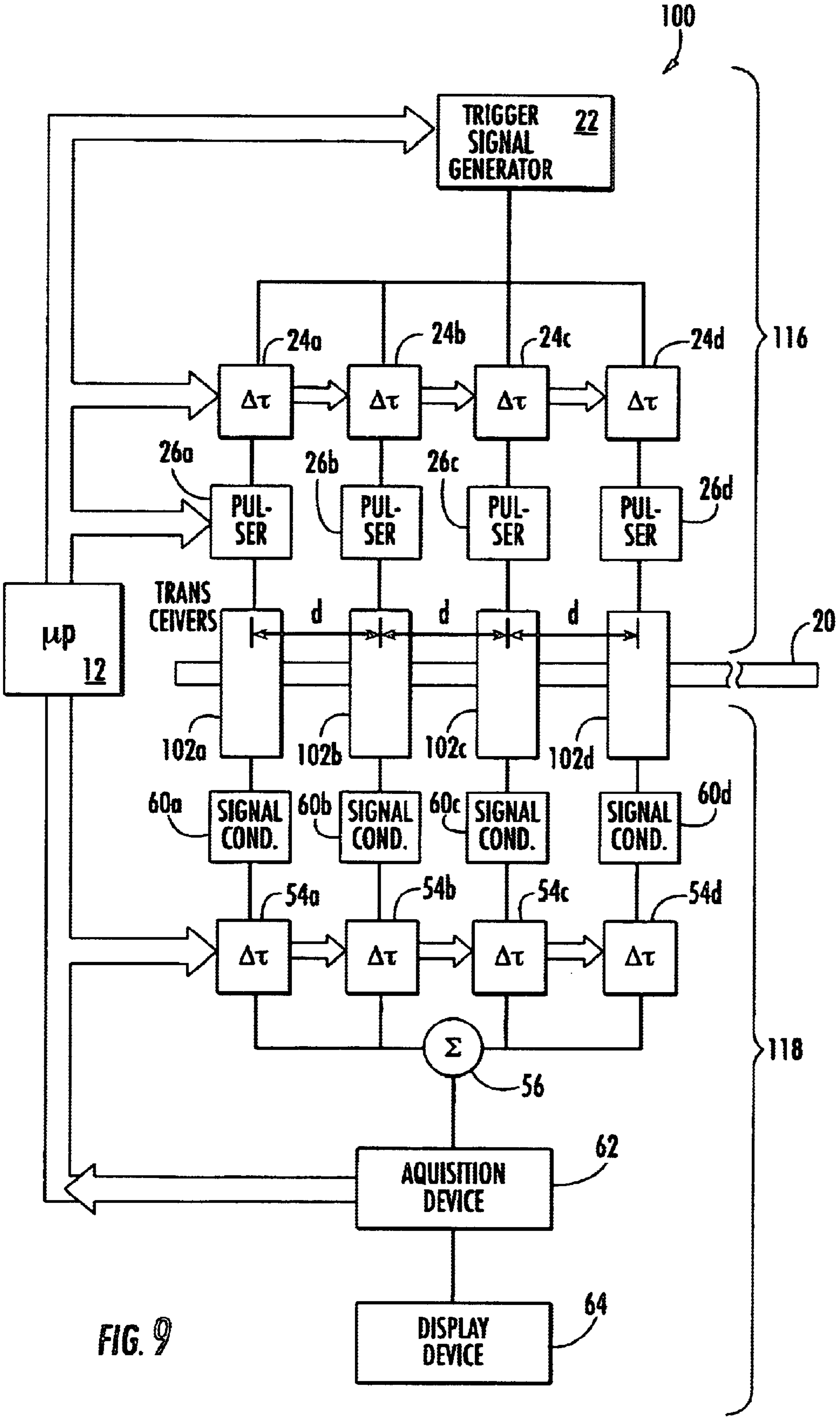
FIG. 9 is a detailed block diagram of the tuned wave phased array in accordance with the present invention showing both the transmitting and receiving portions.

FIG. 9 shows an embodiment of the invention 100 in which the transmitter portion 16 and the receiver portion 18 are combined to form a transmitter/receiver array 100. Array 100 includes a transmitter portion 116 and a receiver portion 118, which are identical to transmitter portion 16, FIG. 3, and receiver portion 18, FIG. 8, respectively, with the exception that transmitters 28*a*–28*d* and receivers 52*a*–52*d* have been replaced by transceivers 102*a*–102*d*, FIG. 9. Transceivers 102*a*–102*d* are separated by a distance d and are capable of operating in a transmit mode and a receive mode. In the transmit mode, transceivers 102*a*–102*d* operate as transmitters and the transmitter portion 116 operates in an identical matter as transmitter portion 16, FIG. 3. In the receive mode, transceivers 102*a*–102*d* act as receivers and receiver portion 118 operates in an identical manner as receiver portion 18, FIG. 8. Accordingly, upon instructions from microprocessor 12, transmitter portion 116 operates to transmit a tuned guided waveform into medium 20. Once the waveform has been transmitted by transmitter portion 116, microprocessor 12 deactivates transmitter portion 116 and activates receiver portion 118 to receive the waveform transmitted by the transmitter portion 116 after it has reflected from either a defect or an edge in the medium 20. Upon receiving the waveform, receiver portion 118 processes the received signal as described above with reference to FIG. 8.

Figure 12:
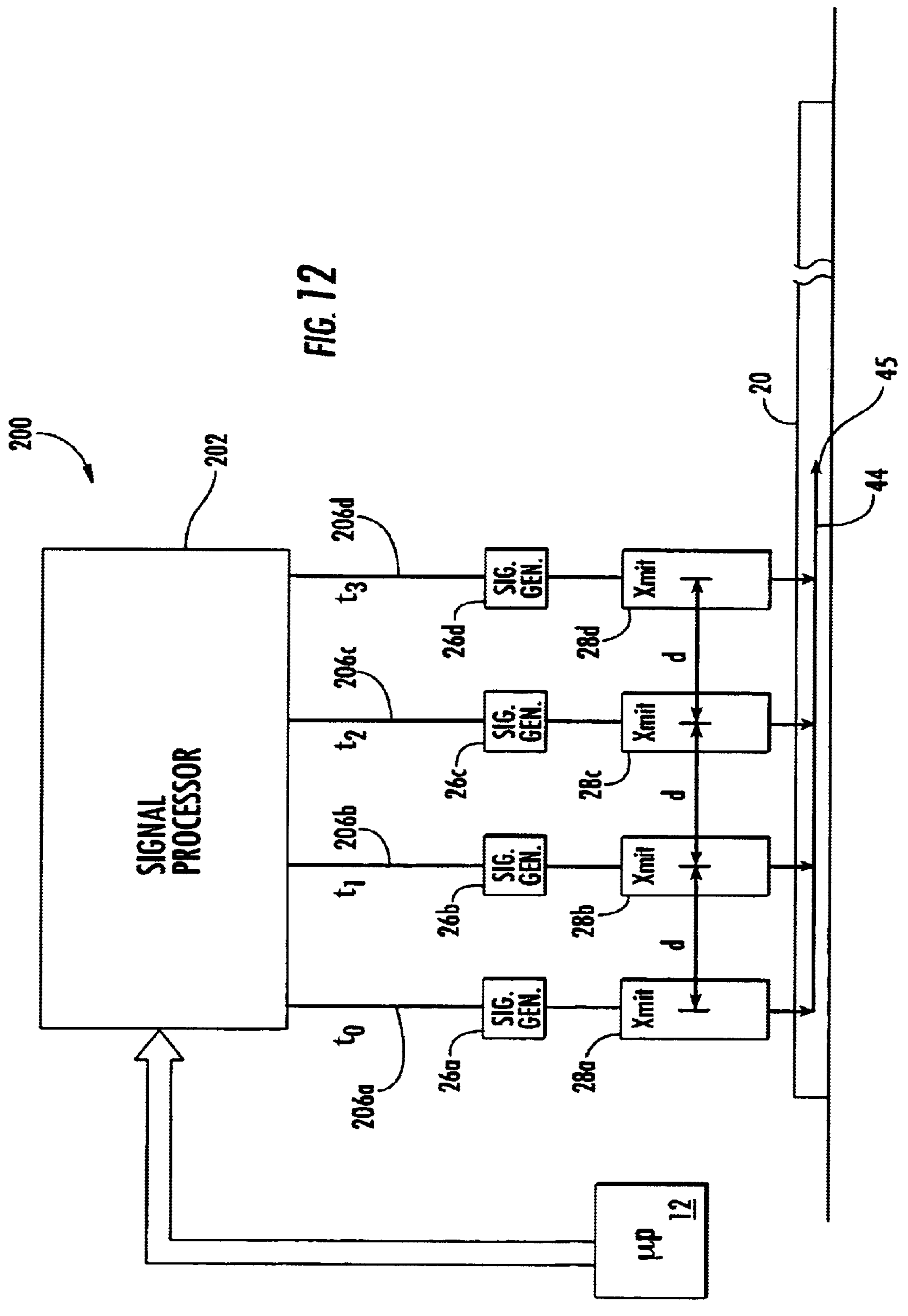
FIG. 12 is a detailed block diagram of an alternative embodiment of the transmitter portion of the tuned wave phased array of the present invention.

In an alternative embodiment, shown at 200 in FIG. 12, the trigger signal generator 22, FIG. 3, and the delay devices 24*a*–24*c* have been replaced by a signal processor 202. Rather than generating one signal that is delayed by a plurality of delay devices for activating transmitters 26*a*–26*d*, signal processor 202, under the control of microprocessor 12, generates a plurality of discrete signals at different points in time wherein the time interval between the generation of the signals is determined by equation (2) above. For example, at a time to, a signal is generated on line 206*a* to activate transmitter element 28*a*. At a time $t_1$, after $\Delta\tau$, as determined by equation 2, a signal is generated on line 206*b* to activate transmitter element 28*c*. At a time $t_2$, after $\Delta\tau$, a signal is generated on line 206*c* to activate transmitter element 28*c* and at a time $t_3$, after $\Delta\tau$, a signal is generated on line 206*d* to activate transmitter element 28*d*. The sequential activation of transmitter elements 28*a*–28*d* generates the same wave in medium 20 as is generated by transmitter portion 16, FIG. 3.

It can therefore be seen that the present invention provides a tuned wave phased array that dynamically tunes a transmitted guided wave to prefer a selected wave mode while suppressing undesired wave modes, that unidirectionally transmits the selected wave mode into the medium under test and that receives and analyzes the transmitted guided wave.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A tuned wave phased array comprising:

a plurality of spaced transmitter elements;

a signal generator that produces an activation signal for activating said transmitter elements to transmit a guided wave in an associated medium; and a delay circuit for sequentially delaying the activation of at least one of said transmitter elements for creating constructive interference of a selected mode of the wave propagating in the medium, thereby boosting the selected mode of the wave.

2. The tuned wave phased array of claim 1 wherein said delay circuit delays said activation signal an amount which corresponds to a distance between each of said transmitter elements.

3. The tuned wave phased array of claim 2 including first and second transmitter elements separated by a distance d, said first transmitter element being directly activated by said activation signal and said second transmitter element being activated by the activation signal after it has been delayed an amount $\Delta\tau$ by said delay circuit.

4. The tuned wave phased array of claim 3 wherein the delay $\Delta\tau$ is determined by the equation $$\Delta\tau = \frac{d}{c_p},$$

where $c_p$ is the phase velocity of the transmitted wave.

5. A method of generating a tuned guided wave comprising:

transmitting a first wave into a medium; and transmitting a second wave into the medium, the second wave being delayed from the first wave by a delay $\Delta\tau$ to constructively interfere the first and second waves to boost a selected propagation mode of the guided wave.

6. The method of claim 5 wherein the amount of the delay $\Delta\tau$ is a function of a phase velocity of the first and second waves in the medium.

7. A tuned wave phased array receiver comprising:

a plurality of spaced receiver elements for sensing a guided wave in a medium; and a delay circuit for sequentially delaying the guided wave received by at least one of said receiver elements to compensate for the spacing between the receiver elements and boost a selected mode in the guided wave.

8. The tuned wave phased array receiver of claim 7 wherein said delay circuit delays the received guided wave an amount which corresponds to a distance between each of said receiver elements.

9. The tuned wave phased array receiver of claim 8 further including:

a summer; and first and second receiver elements separated by a distance d, said first receiver element receiving said guided wave earlier in time than said second receiver element, said first receiver element outputting its received guided wave to said delay circuit for delaying the received guided wave by an amount of time $\Delta\tau$, the delay circuit then outputting the delayed guided wave to said summer, and said second receiver element outputting its received guided wave to said summer;

wherein said summer outputs the sum of the delayed guided wave received by the first receiver element and the guided wave received by the second receiver element.

10. The tuned wave phased array receiver of claim 9, wherein the delay $\Delta\tau$ is determined by the equation:

$$\Delta\tau = \frac{d}{c_p},$$

where $c_p$ is the phase velocity of the guided wave.

11. A method of processing a substantially single mode guided wave in a medium, the method comprising:

sequentially sensing, at different points in time, the substantially single mode guided wave to produce a plurality of received substantially single mode guided waves being delayed in time with respect to each other; and sequentially delaying the plurality of sequentially sensed substantially single mode guided waves to align the sequentially sensed substantially single mode guided wave in time.

12. The method of claim 11 further comprising summing the plurality of aligned substantially single mode guided waves.

13. A tuned wave phased array comprising:

a plurality of spaced transmitter elements; and a signal generator that produces a plurality of activation signals for activating said transmitter elements to transmit a guided wave in an associated medium, said plurality of activation signals being generated at different points in time for creating constructive interference of a selected mode of the wave propagating in the medium, thereby boosting the selected mode of the wave.

14. A method of generating a tuned guided wave comprising:

transmitting a first wave into a medium; and transmitting a second wave into the medium, the second wave being delayed from the first wave by a delay $\Delta\tau$ to constructively interfere the first and second waves to boost a selected propagation mode of the guided wave, wherein the amount of the delay $\Delta\tau$ is a function of a phase velocity of the first and second waves in the medium.

* * * * *